No. 28,860. PATENTED JUNE 26, 1860.
H. L. HAYNES.
COUPLING FOR SHAFTING.

Witnesses.
Edward Farrar
Calvin May Jr

Inventor
Henry L. Haynes.

UNITED STATES PATENT OFFICE.

HENRY L. HAYNES, OF KEENE, NEW HAMPSHIRE.

COUPLING FOR SHAFTING.

Specification of Letters Patent No. 28,860, dated June 26, 1860.

*To all whom it may concern:*

Be it known that I, HENRY L. HAYNES, of Keene, in the county of Cheshire and State of New Hampshire, have invented a new and useful Improvement in Couplings for Connecting Shafts; and I do hereby declare that the following is a full, clear, and exact description of the same, reference being had to the accompanying drawings, in which—

Figure 1:
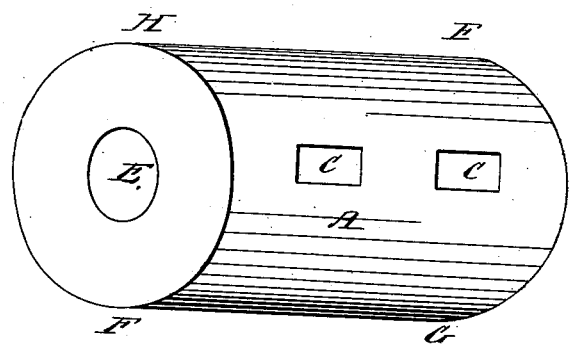
Figure 3:
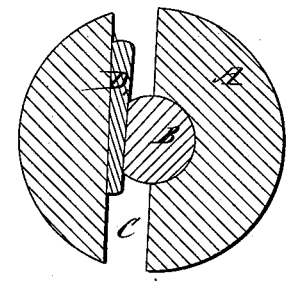
Figure 2:
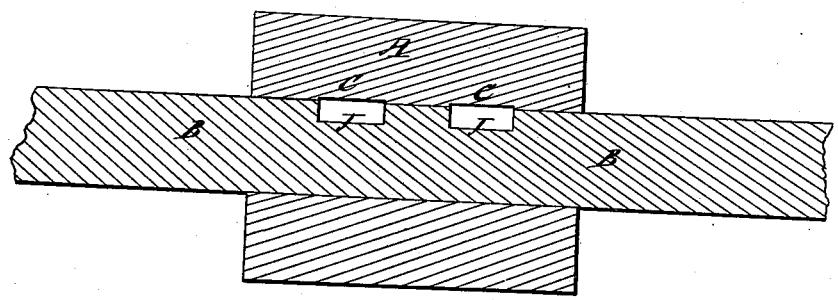

Figure 1 represents a perspective view of the coupling. Fig. 2 represents a longitudinal section through H I, Fig. 1, of coupling with shafts in their proper places to be coupled. Fig. 3 represents a cross section through F, G, Fig. 1, with key driven home.

Similar letters in the three figures indicate corresponding parts.

To enable others skilled in the arts to fully understand, make and use my improved coupling, I proceed to describe it reference being had to the accompanying drawings by letters, in which description I wish to be understood that my invention applies to the coupling of shafts only; but to shafts of any form; that any form may be used for coupling and keys, and any form round, square or triangular, being applicable for slots, C, C, and said slots may be made at right angles to the axis of the shaft as represented or inclined thereto; but for convenience I will describe my manner of applying my improvement to the coupling of round shafts, for which purpose I use a cylinder of cast iron A in which the slots C, C, and the longitudinal hole E, are cored out in casting. The hole E, is bored out to a proper size to receive shafts B, B.

The slots C, C, pass through the coupling A diametrically and are so arranged that the surfaces farthest from the center of the shafts are without the hole E, and placed apart from the center of the coupling longitudinally to give greater strength to the coupling and to allow of the scarfs being made a short distance from the ends of the shafts which gives two shoulders to bear upon the edges of the key to hold the shafts in place longitudinally.

The shafts B, B, are so fitted to the hole E, in the coupling A that the coupling can be slipped entirely onto the shafts easily, which enables a single piece to be taken out of a line of shafting without disturbing the other parts of the line. Cut scarfs J, J, in the shafts to correspond with the slots in the coupling when the shafts are placed in the hole E, as represented in Fig. 2, said scarfs being made deep enough to give good bearing for the keys and shoulders aforesaid. Insert the shafts in the hole E, as represented in Fig. 2, fit tapering keys D nearly wide enough to fill the slots and scarfs longitudinally, also have the tapering sides of the keys fill the space between the scarfs J J and the bearing surfaces of the slots C, C. Drive the keys into these spaces very tight which completes the connection of the shafts.

I do not claim broadly a cross key passing through a shaft as a means of coupling shafts, for this is a well known device; but

What I claim is—

In combination with the keys D, D, and coupling A, the scarfs J, J, in the ends of the shafts B, B; constructed as described.

Witness my hand and seal this first day of Mar; A. D. 1860.

HENRY L. HAYNES. [L. S.]

In presence of—
EDWARD FARRAR,
CALVIN MAY, Jr.